April 9, 1963

R. K. LAMM 3,084,891

AIRPLANE

Filed Feb. 27, 1961

INVENTOR.
Russell K. Lamm
BY
Manfred M. Warren.
Attorney

April 9, 1963

R. K. LAMM 3,084,891

AIRPLANE

Filed Feb. 27, 1961

INVENTOR.
Russell K. Lamm
BY Manfred M. Warren
His Attorney

April 9, 1963

R. K. LAMM 3,084,891

AIRPLANE

Filed Feb. 27, 1961

INVENTOR.
Russell K. Lamm
BY
*Manfred M. Warren*
His Attorney

April 9, 1963 — R. K. LAMM — 3,084,891
AIRPLANE
Filed Feb. 27, 1961 — 6 Sheets-Sheet 4

INVENTOR.
Russell K. Lamm
BY
His Attorney

April 9, 1963

R. K. LAMM 3,084,891

AIRPLANE

Filed Feb. 27, 1961

INVENTOR.
Russell K. Lamm
BY
His Attorney

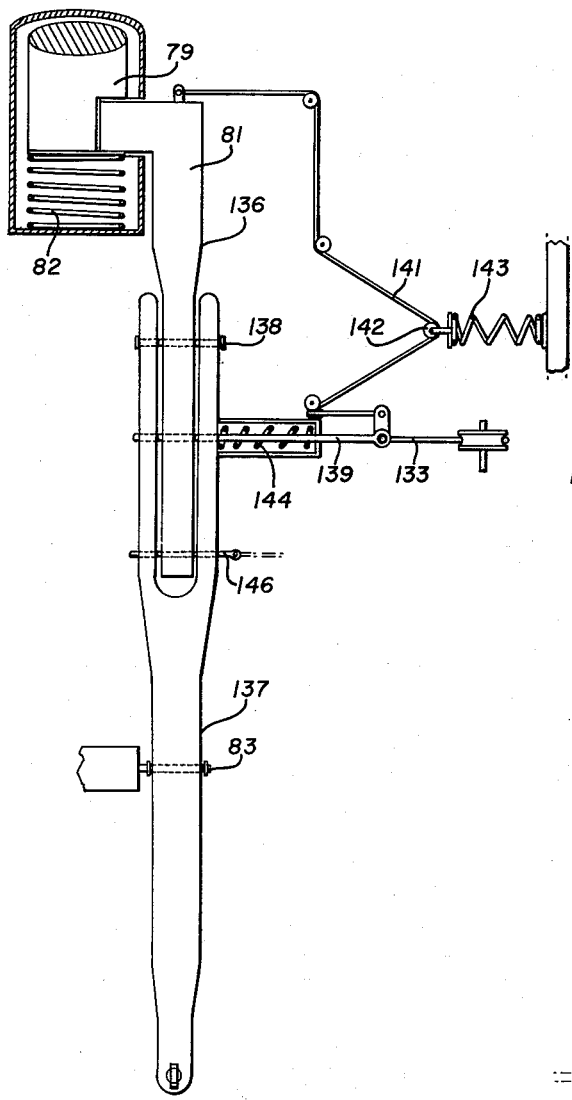

United States Patent Office 3,084,891
Patented Apr. 9, 1963

3,084,891
AIRPLANE
Russell K. Lamm, Berkeley, Calif.
(800 Blair Ave., Piedmont 11, Calif.)
Filed Feb. 27, 1961, Ser. No. 91,798
8 Claims. (Cl. 244—139)

The invention relates to aircraft construction of the type designed for releasing one or more parachutes in the event of an in-flight accident.

Aircraft structures represent a near ultimate in design for minimum weight and maximum strength needed to handle the specialized stresses normally encountered or which may be expected to be encountered in flight. In other respects, however, the airplane structure represents a very thin shell which is incapable of resisting bomb blasts, midair collision, structural failure, or other similar type of in-flight disaster. Under such circumstances the aircraft structure lacks a cohesive integrity and may simply break apart in the air. Earlier attempts to release parachutes from the aircraft structure in the event of an in-flight accident have to a large measure failed because of this lack of structural integrity and the inability of the designers to tie the parachute or parachutes to any substantial portion of the airplane.

An object of the present invention is to provide a safety system for an airplane of the character described which will reenforce and help maintain the structural integrity of the airplane in the event of an in-flight disaster such as bomb blasts, midair collision or structural failure, and do so in such a manner as to increase the probabilities that the crew will be able to exercise some control of the aircraft; or in the event the damage caused by such in-flight disaster was of such proportions that the crew could not exercise control of the airplane, the system would function to lower the aircraft either intact or in sections to the ground by heavy duty parachute assemblies at a relatively low rate of descent. Accordingly, it is an object of the present invention to provide an integral type safety system for aircraft which will save the lives of the passengers and crew or a majority of them, in the event of an in-flight disaster of the character described.

Another object of the present invention is to provide an in-flight safety system for aircraft which will be of minimum over-all weight, may be readily installed in existing types of aircraft structures, and be of moderate cost.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (six sheets):

FIGURE 12 is an enlarged view of one of the parachute release devices, the view being similar to FIGURE 7.

FIGURE 13 is a view of the appartus illustrated in FIGURE 11 but taken at right angles thereto.

Figure 2:
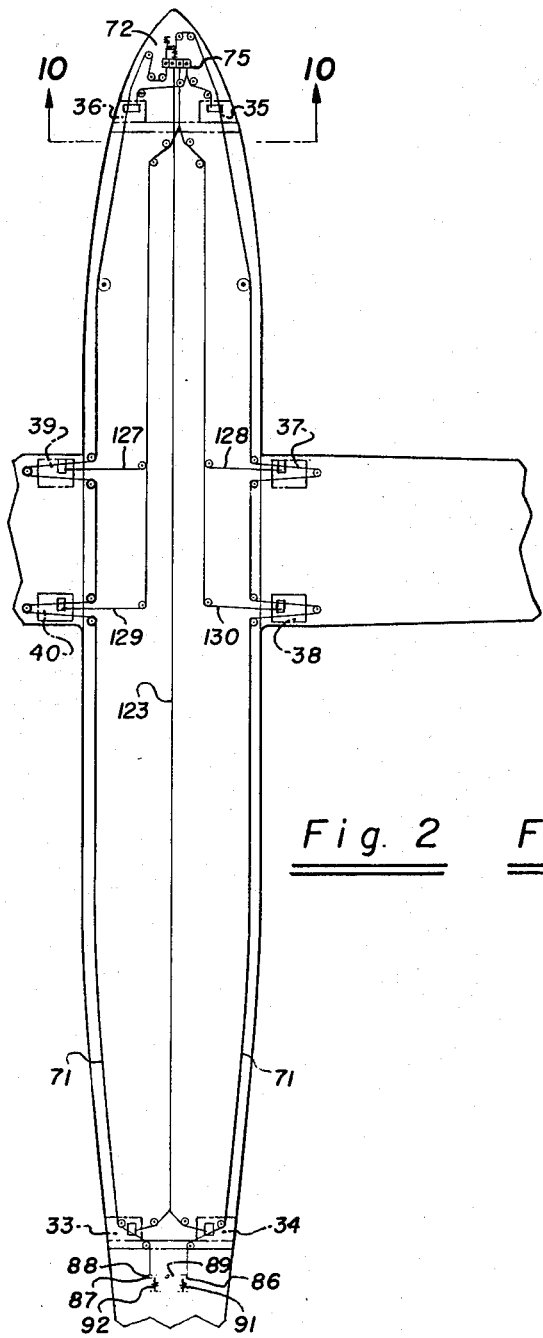
FIGURE 2 is a diagrammatic representation of certain controls used in the system.

The airplane of the present invention consists briefly of a fuselage 16 providing an interior passenger compartment 17; a plurality of passenger seats 18 in the compartment each having a seat frame 19 secured to the fuselage and a passenger seat belt 21 secured to each frame; a cable 22, carried by the fuselage substantially co-extensive with the seats 18; means 27, here a short connecting cable, securing each of the seat frames 19 to cable 22; one or more parachutes 33 carried by the fuselage and connected to cable 22; and means, see generally the control cable and ejection system illustrated in FIGURES 2, 7, 8, 10 and 11, for ejecting the parachute from the fuselage; the heart of the system being the tying together of all of the seat frames by cable 22 which is in turn connected to parachute 33 so that each and all of the passengers are connected by their respective seat belts to the parachute independent of the rest of the airplane structure. Accordingly, even though the frame and fuselage of the aircraft should break up as the result of an in-flight disaster of the type hereinabove noted, the passengers, or at least a majority of them, will be lowered safely to the ground.

Figure 3:
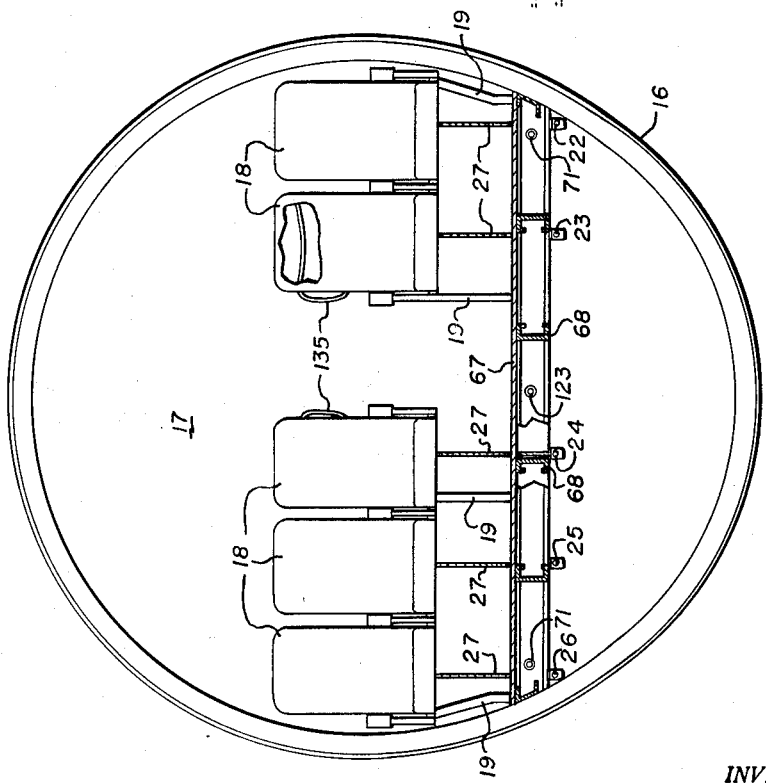
FIGURE 3 is a transverse cross sectional view of an aircraft fuselage embodying the in-flight safety system of the present invention.
Figure 6:
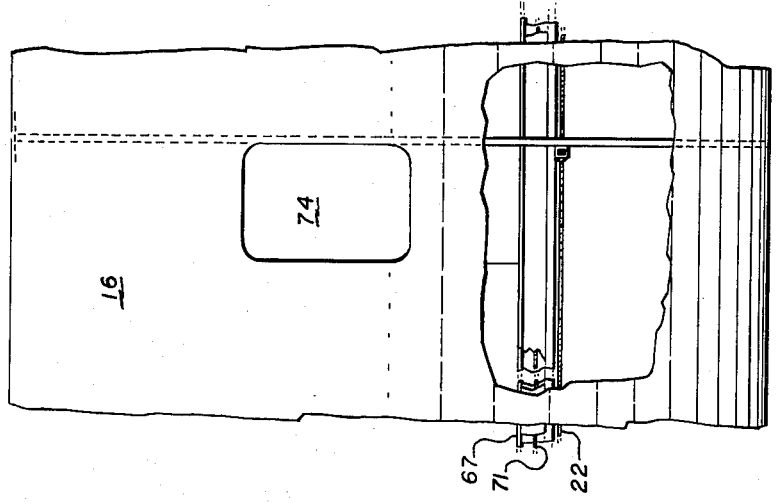
FIGURE 6 is a fragmentary side elevation of a portion of the fuselage taken substantially opposite the plane of FIGURE 5 and with portions broken away to show interior construction.
Figure 5:
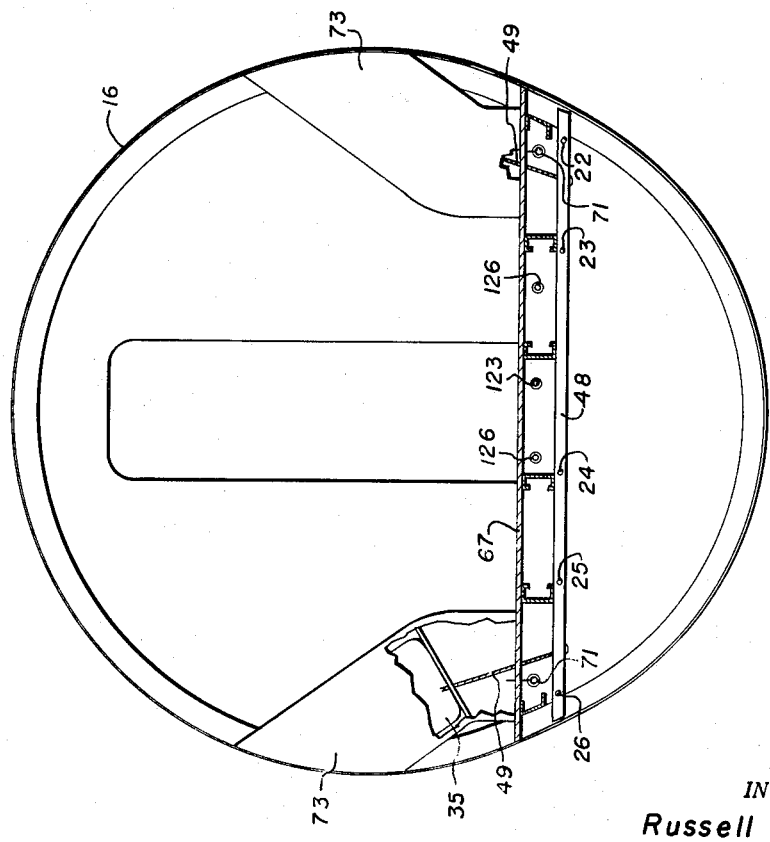
FIGURE 5 is a transverse sectional view of the fuselage taken substantially at the plane of line 5—5 of FIGURE 1.
Figures 7, 8:
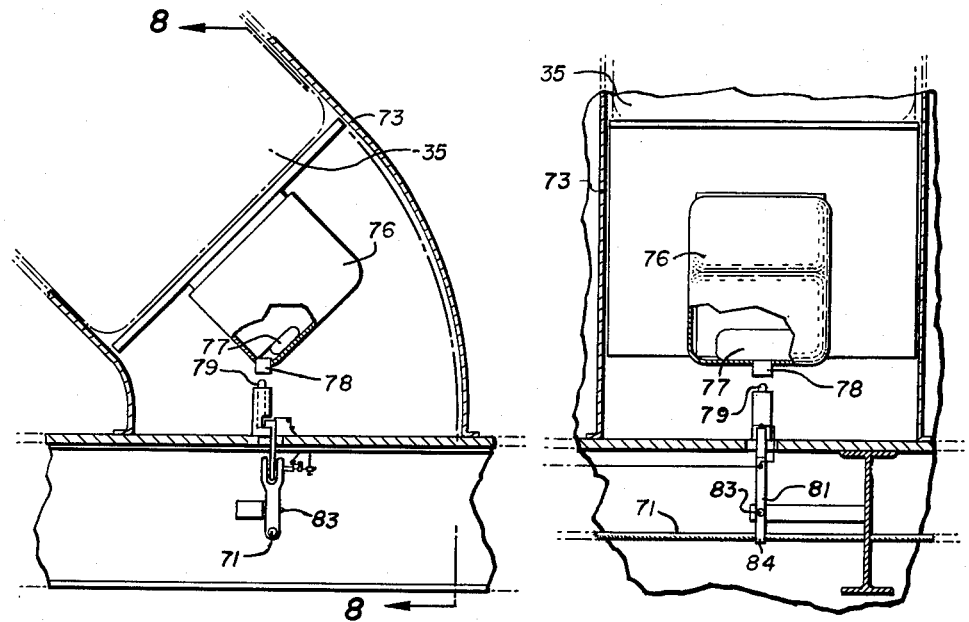
FIGURE 7 is a fragmentary cross-sectional view taken through one of the parachute compartments.
FIGURE 8 is a cross-sectional view taken substantially on the plane of line 8—8 of FIGURE 7.

The structure illustrated in the accompanying drawings conforms generally to that of a conventional passenger aircraft in the provision of an elongated fuselage having a plurality of rows of passenger seats 18, see FIGURE 3, running the length of the fuselage, and in such case, and as here shown, I provide a plurality of longitudinal cables such as cable 22, equal in number to the rows of seats. These underlying cables, numbers 22, 23, 24, 25 and 26, will be seen in FIGURES 1 and 3 of the drawing as being laterally spaced in substantially parallel relation and generally underlying the rows of seats. Also, importantly, cables 22–26 extend longitudinally of and are secured at their ends and at spaced intermediate points to the fuselage to thereby reinforce and assist in maintaining the structural integrity of the airplane. An aft spreader bar 41 is here mounted at the forward face of the aft pressure bulkhead of the airplane and is preferably connected to the fuselage circular frame and longitudinal floor beams at this point. Each of cables 22–26 terminate at their rearward ends at spreader bar 41, the latter functioning to spread the loads acting on the fuselage at this point upon discharge of the parachutes, it being noted that two parachutes 33 and 34 are preferably directly connected by cables 42 and 43 to spreader bar 41.

Figure 1:
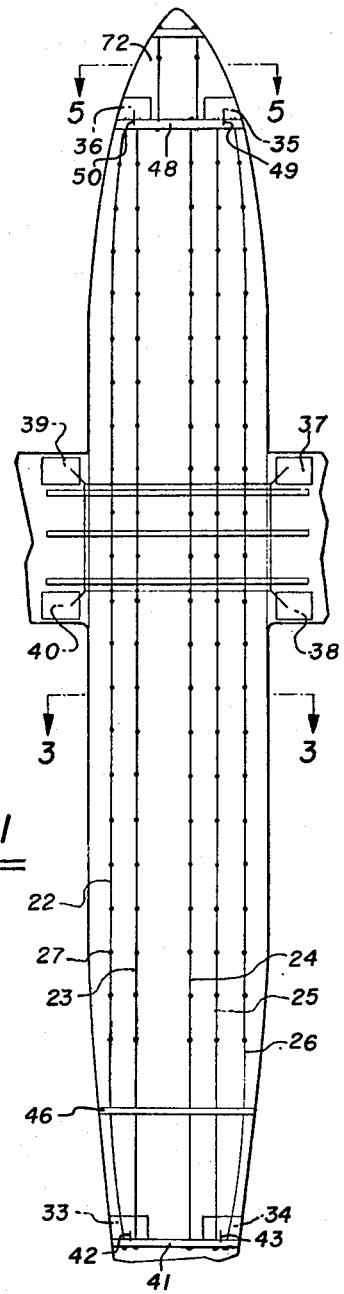
FIGURE 1 is a diagrammatic representation of an in-flight safety system for aircraft constructed in accordance with the present invention.
Figure 4:
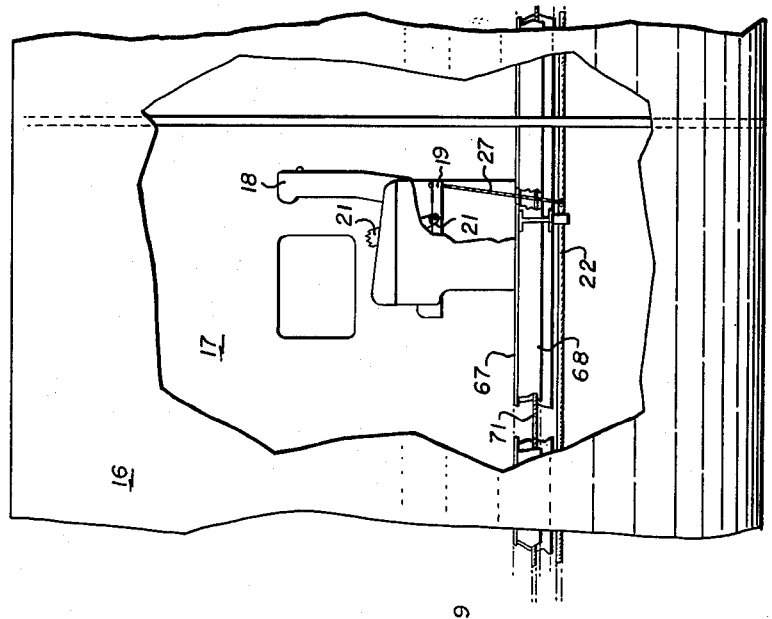
FIGURE 4 is a fragmentary side elevation of the airplane fuselage, with portions broken away to show interior construction.

An intermediate spreader bar 46 is also preferably provided intermediate the aft spreader bar 41 and the wing section and is connected to each of cables 22–26 as illustrated in FIGURE 1 so as to maintain cable separation and to buckle, in conjunction with the floor beams in this area, in a controlled manner for shock absorption in the event of in-flight disaster. This intermediate spreader bar is preferably attached to each end of the fuselage circumferential frame at this point as well as each of the floor beams (both longitudinal and transverse), and to each of the cables 22–26.

The forward spreader bar 43 is here located at the forward face of the forward passenger bulkhead and extends transversely of the fuselage as illustrated in FIGURE 1 and is preferably attached at each end to the fuselage circumferential frame and the floor beams at this point. This forward spreader bar serves as an anchorage for and is secured to the forward ends of cables 22–26, thus connecting all of these cables together at this point and serving also to spread the loads acting on the fuselage upon the discharge of the parachutes, it being noted that two additional parachutes 35 and 36 are directly connected thereto by cables 49 and 50.

Figure 9:
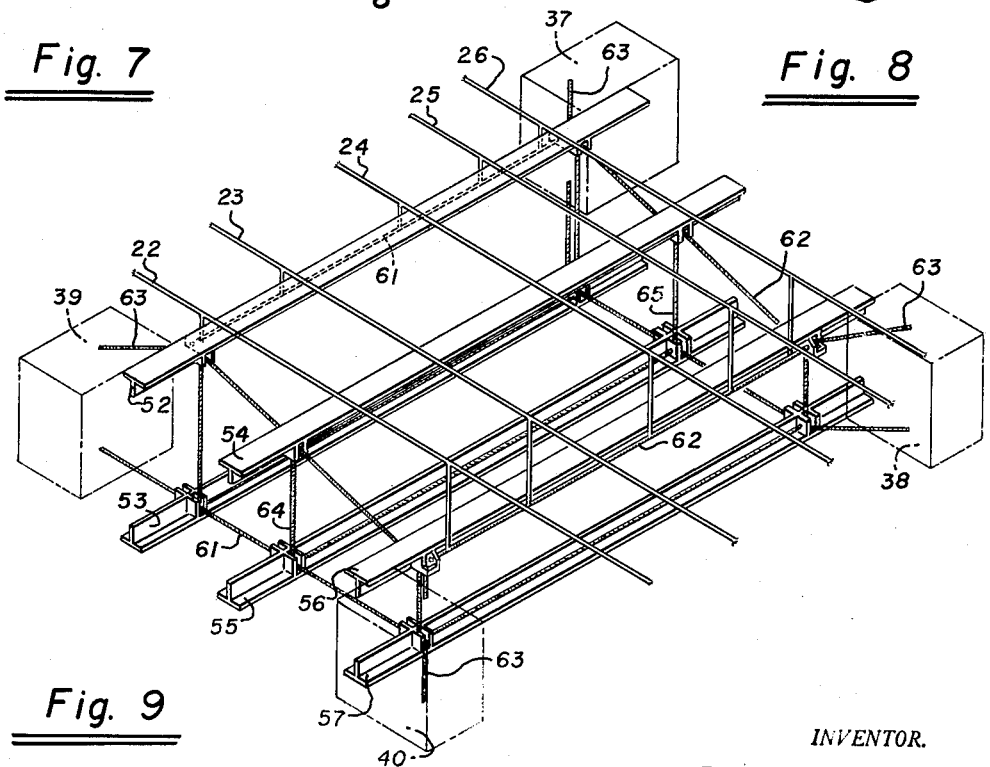
FIGURE 9 is a fragmentary perspective view of the wing center section of the fuselage.

A further cable integrating structure is provided at the wing section of the airplane as illustrated in FIGURE 9. As here shown the fuselage is provided with a plurality of laterally projecting structural elements 52, 53, 54, 55, 56 and 57, sometimes referred to as wing spar caps and which project laterally from the fuselage to define a pair of wing center sections on opposite sides of the fuselage. If desired, parachutes 37, 38, 39 and 40 may be mounted at the leading and trailing edges of each of these sections as depicted in FIGURE 9. Perimeter cables 61 and 62 here extend around and are secured at space points to and serve to tie together all of the structural elements 52–57 and these cables are in turn connected to parachutes 37–40 by cables 63. Also, preferably the perimeter cables 61 and 62 are connected across mid-portions thereof by vertical articulating cables 64 and 65. As will be also observed from FIGURE 9, each of the longitudinal cables 22–26 are secured to each of the perimeter cables 61—62 thereby integrating the wing center section with its four parachute assemblies to the longitudinal cables and the passenger seats.

With reference to FIGURE 3, it will be seen that the interior passenger compartment 17 of the fuselage is defined in part by a floor 67 having subjacent longitudinally spaced and transversely extending floor beams 68 which generally underlie the transverse rows of seats 18. These transverse beams 68 may be used to securely tie together the plurality of longitudinally extending cables 22–26 and the plurality of cables 27 secured to each of the seat frames 19, the floor beams 68 further serving as additional spreader bars for cables 22–26.

The foregoing arrangement provides a network of sturdy cables which run the entire length of the fuselage and encompass the center wing at the wing-fuselage junction and provide blast and shock absorption and a reinforcing of the structural integrity of the aircraft, thereby increasing the possibilities that the crew may be able to exercise sufficient control of the aircraft which has suffered a type of midair disaster above discussed to bring the aircraft safely down, or where the crew cannot exercise such control, then to provide an automatic lowering of the aircraft either intact or in sections by the heavy duty parachute assemblies at a relatively low rate of descent. As will be further observed, the safety of the individual passengers fastened by their seat belts to the integrating cable network is not dependent upon the holding together of the rather flimsy shell of the aircraft and in fact the concept of the present invention is to tie or connect each individual passenger to one or a plurality of parachutes for safely lowering to the ground in the case of an inflight disaster without regard to what happens to the rather fragile aircraft structure.

In accordance with the present invention, the control system for ejecting the several parachutes includes a flexible line 71, see FIGURE 2, which is distended longitudinally of the fuselage and which functions in combination with parachute ejection means, see FIGURES 7, 8, 12 and 13, which responds to a pull on the line to eject the parachutes from the fuselage, it being a further feature of the invention that the line 71 is mounted for shock responsive lateral displacement for producing this pull. Additionally, there is provided within the pilot compartment 72 a manually engageable and displaceable means 75 connected for exerting the requisite pull on line 71 for actuating the parachute ejection means so that the parachutes may be released either automatically by shock or manually by the pilot.

As will be seen from FIGURE 2, a plurality of flexible lines 71 extend continuously over the length of the fuselage and are attached to all of the parachute triggering mechanisms. Preferably these lines are semi-encased in the baggage sections of the fuselage as seen in FIGURE 3 to prevent inadvertent discharge of the parachutes during baggage loading, etc. The parachute triggering mechanisms are so arranged as to effect a release of the parachutes whenever the lines 71 are moved beyond a prescribed or allowable displacement thus making the parachute release automatic in the case of bomb blasts, midair collisions, or structural failure while the aircraft is in flight.

The parachute release mechanisms are illustrated in FIGURES 5, 6, 7 and 8 which show the forward parachute assemblies and the ejection mechanism for parachute 35 in particular. However, each of the parachute ejection mechanisms are essentially similar and a description of the typical structure shown in FIGURES 7 and 8 will suffice for all. As there shown, the parachute 35 is normally stored in compacted form in a compartment 73 which extends to the outside surface of the aircraft and is normally closed off by a demountable or ejectable door or closure 74, see FIGURE 6. Mounted at the base side of the compartment 73 is a compression chamber 76 which may contain an explosive powder charge 77 connected to a percussion cap 78. A firing pin 79 is mounted in alignment with and for striking cap 78 and is normally held in spaced relation by a detent 81 which holds the firing pin against a compression spring 82. Detent 81 is hinged at a mid-point on pivot pin 83 so as to swing from a position holding firing pin 79 in a cocked position to a displaced position releasing pin 79 for movement to percussion cap 78 under the action of spring 82. The outer end 84 of detent 81 is fastened to the actuating line 71. Accordingly upon appropriate displacement of line 71, firing pin 79 will be released to set off the powder charge 77 and eject the parachute.

Figure 10:
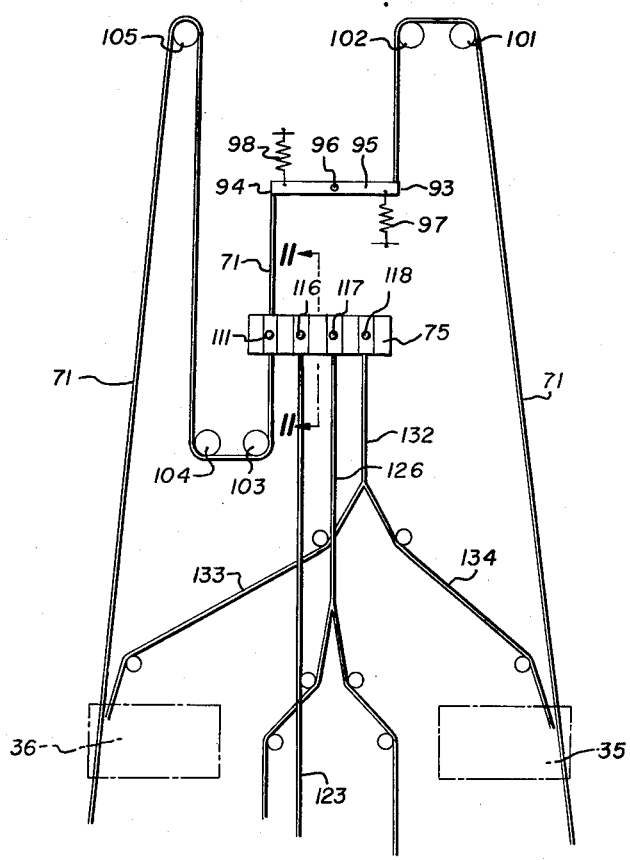
FIGURE 10 is a diagrammatic representation of a portion of the control system used in the present invention.

As will be seen in FIGURE 2, the manually engageable and displaceable means 75 in the pilot compartment is connected for exerting a simultaneous pull on both of the lines 71 and additionally means is provided for transmitting the automatic shock responsive pull of one line to the other line. The aft ends of the two lines 71 are connected to the opposite ends 86 and 87 of lever 88 which is hinged on a center pivot pin 89 and normally biased by a pair of cable tension springs 91 and 92 connected between lever ends 86 and 87 and the fuselage. With reference to FIGURE 10 it will be seen that the forward ends of lines 71 are similarly connected to the opposite ends 93 and 94 of a lever 95 hinged on a center hinge pin 96 and biased by cable tension springs 97 and 98 which are arranged to produce a clock-wise moment on lever 95. The forward end portions of the lines are mounted on a series of pulleys 101, 102, 103, 104 and 105 arranged as illustrated so as to balance the biasing moment produced by springs 97 and 98 so that the lines 71 and levers 88 and 95 and springs 91, 92, 97 and 98 are normally in balance with the lines 71 in tension. Accordingly a lateral deflection or a pull exerted on one line will be automatically transferred to the other line.

Figure 11A:
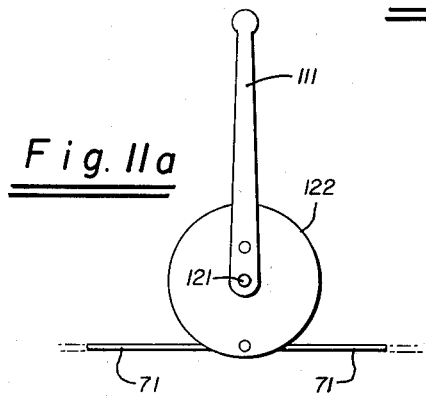
FIGURE 11a is a fragmentary cross-sectional view of one of the manual operating levers in the control assembly indicated by line 11—11 in FIGURE 10.
Figure 11B:
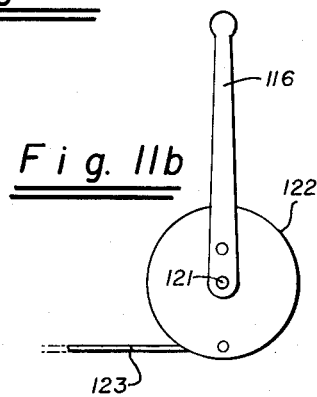
FIGURE 11b is a fragmentary cross-sectional view of the control assembly, see line 11—11 of FIGURE 10, but showing another of the manual operating levers.

The parachute triggering mechanisms for each of the parachutes is connected to lines 71 as illustrated in FIGURE 2 so that the displacement of either line will set off all of the parachutes. This may be accomplished manually by a control lever 111 in the pilot's compartment forming part of control unit 75 and which is connected as illustrated in FIGURES 10 and 11a to one of the lines 71 so that a rotary displacement of lever 111 will produce a corresponding displacement of line 71. As illustrated in FIGURE 11a, lever 111 is journalled on shaft 121 and is provided with a drum 120 fastened to cable 71. Preferably three additional control levers 116, 117 and 118 are provided in the control unit 75 so as to selectively eject the rear parachutes 33 and 34, the wing parachutes 37–40, and the forward parachutes 35 and 36 respectively. A typical construction of each of controls 116, 117 and 118 is illustrated in FIGURE 11b, showing particularly control lever 116 which is pivoted for rotation on shaft 121 and is provided with a cable drum 122 attached to cable 123. The latter extends longitudinally to the rear of the aircraft where the cable divides, as illustrated in FIGURE 2, for connection to the triggering mechanisms for parachutes 33 and 34. Similarly, operating lever 117 is connected by cable 126 which is in turn connected to branch cables 127, 128, 129 and 130 which teminate at the tirggering mechanisms for parachutes 37–40. Operating lever 118 is connected by cable 132 which is in turn connected to branch cables 133 and 134 which terminate at the triggering mechanisms for parachutes 35 and 36.

The triggering mechanisms for the several parachutes are designed to permit discrimination between an automatic ejection of all of the parachutes and a selective manual ejection of any of them. As will be best seen in FIGURES 12 and 13, the detents 81 for each of the triggering mechanisms are each composed of a pair of hinged sections 136 and 137 pivotally attached by hinge pin 138. Normally the sections 136 and 137 are held for joint movement by a release pin 139 mounted through aligned openings in the sections so that the two sections swing as a unit about pivot pin 83 when actuated automatically by cable 71. Manual actuation of the assembly is effected by withdrawing pin 139 and simultaneously swinging the upper section 81 around pivot pin 138. Each of the manually operated cables are so connected. For example, cable 133 is here shown connected to pin 139 for effecting its withdrawal upon manual displacement of lever 118. A cable 141 is connected as illustrated in FIGURES 12 and 13 to the upper detent section 136, this cable also being connected by pulley 142 to spring 143 for placing the spring in tension upon withdrawing a pin 139 so as to cause the displacement of upper section 136 abruptly upon withdrawal of pin 139 to release the upper section for movement about pivot pin 138. Spring 143 also functions in conjunction with spring 144 to retain pin 139 in engaged position prior to actuation by cable 133.

A safety pin 146 may be inserted through the detent sections to normally ensure their unitary connection and which may be formed for shearing, upon manual operation, or for removal prior to putting an aircraft in operation.

Since, as hereinbefore noted, the safety system of the present invention contemplates the connection of all of the seat frames of the aircraft through a cable network to the parachutes, I additionally provide on each of the aisle passenger seats a rope safety handle 135 as seen in FIGURE 3 for the use of passengers who might be in the aisle at the time of an accident.

As will be understood, aircraft exist in many models, types and designs and accordingly the present system will need be tailored to fit particular aircraft and the number and location of parachutes, for example, may vary for different aircraft.

I claim:

1. In an airplane, an elongated fuselage having a longitudinal axis providing an interior passenger compartment, a plurality of passenger seats in said compartment each having a seat frame secured to said fuselage and a passenger seat belt secured to each frame, a cable carried by said fuselage over substantially the full length thereof substantially parallel to said axis and substantially coextensive with said seats, means of securing each of said seat frames to said cable, a parachute carried by said fuselage and connected to said cable, and means for ejecting said parachute from said fuselage.

2. In an airplane, an elongated fuselage having a longitudinal axis providing an interior passenger compartment, a row of passenger seats in said compartment each having a seat frame secured to said fuselage and a passenger seat belt secured to each frame, a cable extending longitudinally over substantially the full length of said fuselage substantially parallel to said axis and secured to said fuselage, means of securing each of said seat frames to said cable, a parachute carried by said fuselage and connected to said cable, a flexible line distended longitudinally of said fuselage, and parachute ejection means connected to said line and responding to a pull on said line to eject said parachute from said fuselage, said line being mounted for shock responsive lateral displacement producing said pull.

3. In an airplane, an elongated fuselage having a longitudinal axis providing an interior passenger compartment and a pilot compartment, a row of passenger seats in said passenger compartment each having a seat frame secured to said fuselage and a passenger seat belt secured to each frame, a cable extending substantially parallel to said axis and substantially the full length of said fuselage and secured to said fuselage, means securing each of said seat frames to said cable, a parachute carried by said fuselage and connected to said cable, a flexible line distended longitudinally of said fuselage, parachute ejection means connected to said line and responsive to a pull thereon to eject said parachute from said fuselage, manually engageable and displaceable means in said pilot compartment connected for exerting said pull on said line, and said line being mounted within said fuselage for automatic shock responsive lateral displacement similarly producing said pull.

4. In an airplane, an elongated fuselage having a longitudinal axis providing an interior passenger compartment, rows of passenger seats in said compartment, each seat having a frame secured to said fuselage and a passenger seat belt secured to each frame, a plurality of cables extending parallel to said axis substantially the full length of said fuselage and secured at their ends and at spaced intermediate points to said fuselage to thereby reinforce and assist in maintaining the structural integrity of the airplane, said cables being laterally spaced in substantially parallel relation to said rows of seats, means of securing each of said seat frames to one of said cables, a parachute carried by said fuselage and connected to said cables, and means for ejecting said parachute from said fuselage.

5. In an airplane, an elongated fuselage having a longitudinal axis providing an interior passenger compartment defined in part by a floor having subjacent longitudinally spaced transversely extending floor beams, rows of passenger seats in said compartment, each seat having a frame secured to said floor and a passenger seat belt secured to each frame, a plurality of cables extending substantially parallel to said axis and substantially the full length of said fuselage and secured in underlying relation to said rows and being secured at spaced intermediate points to said beams to thereby reinforce and assist in maintaining the structural integrity of the airplane, means of securing each of said seat frames to one of said cables, a parachute carried by said fuselage and connected to said cables, and means for ejecting said parachute from said fuselage.

6. In an airplane, an elongated fuselage having a longitudinal axis providing an interior passenger compartment, a row of passenger seats in said compartment, each of said seats having a frame secured to said fuselage and a passenger seat belt secured to each frame, a first cable extending substantially parallel to said axis and substantially the full length of said fuselage and secured to said fuselage, means securing each of said seat frames to said cable, said fuselage having laterally projecting structural elements defining a pair of wing center sections on opposite sides of said fuselage, parachutes mounted at the leading and trailing edges of each of said sections, second and third cables extending around and secured at spaced points to and tying together said structural elements of each said wing section and being connected to the leading and trailing parachutes thereof, means connecting said first cable to said second and third cables, and means for ejecting said parachutes from said wing sections.

7. An airplane as characterized in claim 6 and having a plurality of longitudinal rows of passenger seats in said compartments and a plurality of first cables secured to each seat frame and to said second and third cables, a pair of transversely extending spreader bars carried by said fuselage and connected to the forward and rearward ends of said first cables extending substantially parallel to said longitudinal axis and substantially the full length of said fuselage and a second set of four parachutes carried by said fuselage adjacent to and being connected to the ends of said spreader bars, and ejection means for said second set of parachutes connected for operation with said first-named parachute ejection means.

8. In an airplane, an elongated fuselage having a longitudinal axis providing an interior passenger compartment and a pilot compartment, rows of passenger seats in said passenger compartment, each seat having a frame secured to said fuselage and a passenger seat belt secured to each frame, a plurality of cables extending substantially longitudinal to said axis and substantially the full length of said fuselage and secured to said fuselage in generally parallel relation to said rows, means securing said seat frames to said cables, a plurality of parachutes carried by said fuselage and connected to said cables, a plurality of flexible lines distended longitudinally of said fuselage, means for ejecting said parachutes from said fuselage and including a triggering mechanism for each parachute connected to one of said lines and responsive to a pull thereon to eject the associated parachute, manually engagable and dislaceable means in said pilot compartment connected for exerting a simultaneous pull on all of said lines and said line being mounted within said fuselage for automatic shock responsive lateral displacement similarly producing said pull, and means transmitting the automatic shock responsive pull of one line to all lines.

References Cited in the file of this patent
UNITED STATES PATENTS

| | | |
|---|---|---|
| 1,350,266 | Roe | Aug. 17, 1920 |
| 1,786,169 | Pellegrino | Dec. 23, 1930 |
| 1,835,656 | Lehmann | Dec. 8, 1931 |
| 1,900,891 | Crane | Mar. 7, 1933 |
| 2,072,600 | Lewis et al. | Mar. 2, 1937 |
| 2,705,586 | Young | Apr. 5, 1955 |

FOREIGN PATENTS

| | | |
|---|---|---|
| 527,693 | Great Britain | Oct. 15, 1940 |
| 692,535 | France | Aug. 4, 1930 |